United States Patent [19]

Wiebe

[11] 4,043,147

[45] Aug. 23, 1977

[54] INTERSHAFT BALANCE WEIGHT

[75] Inventor: David J. Wiebe, Palm Beach Gardens, Fla.

[73] Assignee: The United States of America as represented by the Secretary of the Air Force, Washington, D.C.

[21] Appl. No.: 696,344

[22] Filed: June 15, 1976

[51] Int. Cl.² ............................................. F16C 1/00
[52] U.S. Cl. ..................... 64/1 V; 64/1 R; 74/574; 415/104
[58] Field of Search ............ 64/1 V, 1 R; 74/574, 74/573; 415/104

[56] References Cited

U.S. PATENT DOCUMENTS

| 1,664,713 | 4/1928 | Strickland | 64/1 V |
| 2,652,700 | 9/1953 | Seibel | 74/574 |
| 3,286,487 | 11/1966 | Esperson | 74/574 |
| 3,964,342 | 6/1976 | Bean, Jr. | 64/1 V |

FOREIGN PATENT DOCUMENTS

| 404,153 | 1/1934 | United Kingdom | 64/1 V |

Primary Examiner—Samuel Scott
Assistant Examiner—Randall Heald
Attorney, Agent, or Firm—Joseph E. Rusz; Arsen Tashjian

[57] ABSTRACT

A balance weight supported by a spring clip is inserted inside the low turbine shaft of a jet engine at the proper position and frictionally engages an inner bulkhead in the form of an "anti-oval plug". The clip is provided with a threaded opening to receive the threaded end of an elongated rod whereby the clip is inserted within the shaft and installed at the desired location after which the rod is unscrewed from the clip and withdrawn, leaving the weight in place on the anti-oval plug.

2 Claims, 3 Drawing Figures

U.S. Patent  Aug 23, 1977  4,043,147
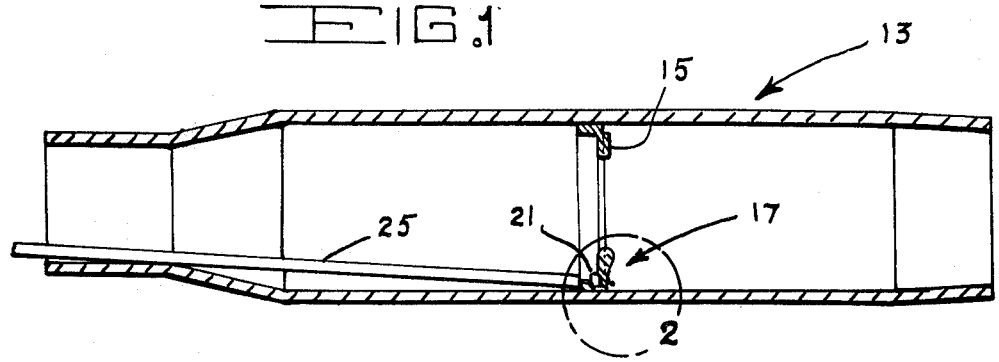
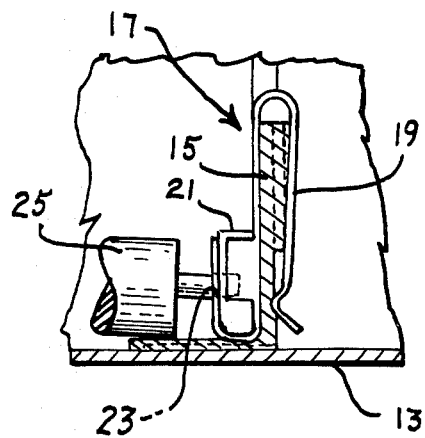
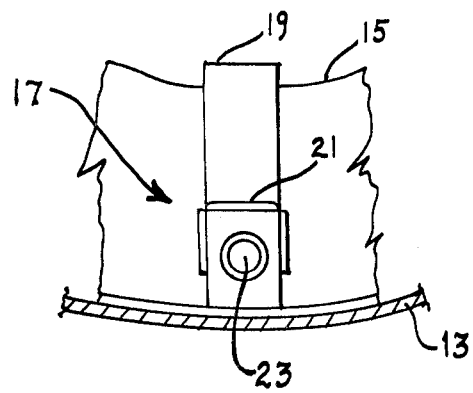

INTERSHAFT BALANCE WEIGHT

STATEMENT OF GOVERNMENT INTEREST

The invention described herein may be manufactured and used by or for the Government for governmental purposes without the payment of any royalty thereon.

BACKGROUND OF THE INVENTION

This invention relates to a means for trim balancing the low turbine shaft of a jet engine and, more particularly, the invention is concerned with providing a balance weight which can be inserted into a hollow turbine shaft and clipped to a support member therein in the proper position without disassembling the engine.

Jet engines are said to be comparatively free of vibration. Occasionally, however, vibration is noticed during operation. If it is excessive, the cause must be located and eliminated because vibrations can become dangerous under certain conditions and cause undue wear of operating parts.

Ordinarily, the operational check for engine vibration requires that an engine be operated while a vibrometer is placed against it in several places, usually over the compressor, turbine wheel and the bearing housings. The degree of vibration may be read directly from the vibrometer, after which the engine is shut down. When excessive vibration is noticed, the engine is usually scheduled for overhaul.

The excessive vibration is generally produced by an unbalance somewhere in the rotating system causing the shaft to whip sideways and with possible damage to the engine. Overhauling the engine to correct the unbalance is a tedious and time consuming procedure. It would be much more desirable if the unbalance could be corrected by a simpler and easier procedure which would not require any substantial disassembly of the engine.

SUMMARY OF THE INVENTION

The present invention is concerned with providing a device for trim balancing the low turbine shaft of a jet engine. A balance weight is inserted in the inside of the low turbine shaft approximately 3.5 feet from the front of the shaft without disassembling the engine.

Accordingly, it is an object of the invention to provide a means for trim balancing the low turbine shaft of a jet engine which is installed in an airframe or test stand.

Another object of the invention is to provide an intershaft balance weight for trim balancing a turbine rotor. The weight can be inserted in position by a simple tool after removing the nose cone and torque nut on the fan rotor.

Still another object of the invention is to provide trim balancing means for correcting the imbalance of the low rotor shaft by attaching a balance weight of predetermined value to the anti-oval plug inside the rotor shaft. A spring clip fits over the anti-oval plug for retaining the balance weight in position.

A further object of the invention is to provide a balancing weight for attachment to the anti-oval plug, inside a low turbine shaft. The weight is attached by means of a spring clip which is provided with a threaded opening for engaging an elongated installation rod. The rod is disengaged and removed after the weight is in position on the anti-oval plug.

These and other objects, features and advantages will become more apparent after considering the following detailed description taken in conjunction with the annexed drawing and appended claims.

BRIEF DESCRIPTION OF THE DRAWINGS

FIG. 1 is a longitudinal cross-sectional view of the low rotor shaft of a typical jet engine showing the anti-oval plug with the balance weight attached thereto and the installation rod in operating position according to the invention;

FIG. 2 is an enlarged side view of the circled area of FIG. 1 showing the balance weight attached to the anti-oval plug with the inner end of the installation rod in position prior to disengagement from the balance weight and removal from the turbine rotor shaft; and FIG. 3 is a front view of the balance weight in position on the anti-oval plug inside the low rotor shaft showing the threaded opening from which the installation rod has been removed.

DESCRIPTION OF A PREFERRED EMBODIMENT

Referring now to the drawings wherein like reference characters designate identical parts in the several views, in FIG. 1 there is shown a longitudinal cross-sectional view of a low rotor shaft 13 which is installed in a low turbine of a jet engine of the type used on an F-100 military aircraft. The shaft 13 is of hollow tubular configuration and installed near the central area on the inner wall is an anti-oval plug 15 which is essentially an annular member in contact with the inner surface of the shaft 13 with a right angled portion which extends radially inward from one edge of the plug 15 toward the axis of the shaft 13. This arrangement effectively operates to stiffen the hollow shaft 13 and prevent it from changing shape during high speed operation. The right angled portion of the anti-oval plug 15 forms a wall or bulkhead inside the hollow turbine shaft 13.

In order to trim balance the hollow low turbine shaft 13 it is necessary to position a balance weight 17 in a particular location within the shaft 13. The present invention provides a spring clip 19 which can be attached to the right angled portion of the anti-oval plug 15. A variable weight 21 is held firmly in the clip 19 by brazing or some other convenient means after the clip 19 has been bent around to substantially encase the weight 21.

To install the clip 19 with the weight 21 attached thereto on the anti-oval plug 15, a threaded opening 23 is provided in the front face of the clip 19 into which the threaded forward end of an elongated installation rod 25 is screwed. The rod 25 with the clip 19 threadably attached to the forward end thereof is then inserted into the open forward end of the low turbine shaft 13. The clip 19 with the weight 21 affixed thereto is then slipped over the inward edge of the right angled portion of the anti-oval plug 15 at the proper location and the rod 25 is unscrewed from the threaded hole 23 and withdrawn leaving the weight 21 clipped to the anti-oval plug 15.

Balance weights have been used in many shapes and arrangements to balance rotating machinery of various types including turbine shafts. However, substantial disassembly of the machinery or equipment is generally required in order to accomplish the balancing operation. In the present invention, the balancing operation is accomplished by inserting a weight inside a hollow shaft, rotatable about its longitudinal axis, from an opening end and mounting the weight at some selected position to balance the shaft. It is necessary only to remove the nose cone and torque nut on the fan rotor (not shown) and the balance weight can then be installed with the simple tool, namely the elongated rod 25.

Although the invention has been illustrated in the accompanying drawings and described in the foregoing specification in terms of a preferred embodiment thereof, the invention is not limited to this embodiment or to the particular configuration disclosed. It will be apparent to those skilled in the art that certain changes, modifications and substitutions can be made, particularly with respect to the construction details, without departing from the true spirit and scope of the appended claims.

Having thus set forth the nature of my invention, what I claim and desire to secure by Letters Patent of the United States is:

1. An intershaft balance weight for use on the low turbine shaft of a jet engine and the like, comprising, a hollow shaft having an open forward end, an anti-oval plug of annular configuration fixedly attached near the longitudinal center of the shaft and in contact with the inner surface thereof, said anti-oval plug including a right angled portion extending upwardly from one edge thereof, said inwardly extending right angled portion forming a wall inside said hollow turbine shaft, and means for attaching the balance weight to a predetermined position on said anti-oval plug through the open forward end of said hollow shaft without substantial disassembly of the jet engine thereby trim balancing the turbine shaft.

2. The intershaft balance weight defined in claim 1 wherein the means for attaching the balance weight to the anti-oval plug includes a clip having an elongated U-shaped portion for engaging the right angled portion of said anti-oval plug and a plurality of bent ears for holding a variable weight therein, and an elongated rod threadably attached to said clip during the installation of said balance weight, said elongated rod being removed after said balance weight is positioned on said anti-oval plug.

* * * * *